United States Patent [19]

Senda et al.

[11] Patent Number: 4,617,322

[45] Date of Patent: Oct. 14, 1986

[54] PRE-EXPANDED PARTICLE OF NON-CROSSLINKED LINEAR LOW DENSITY POLYETHYLENE

[75] Inventors: Kenichi Senda, Hirakata; Masao Ando, Toyonaka; Kyoichi Nakamura, Osaka; Tatehiko Nishida, Ibaraki, all of Japan

[73] Assignee: Kanegafuchi Kagaku Kogyo Kabushiki Kaisha, Osaka, Japan

[21] Appl. No.: 748,803

[22] Filed: Jun. 26, 1985

Related U.S. Application Data

[63] Continuation-in-part of Ser. No. 584,859, Feb. 29, 1984, Pat. No. 4,540,718.

[30] Foreign Application Priority Data

Apr. 5, 1983 [JP] Japan .................................. 58-60591
Jan. 18, 1984 [JP] Japan .................................. 59-7634

[51] Int. Cl.$^4$ ................................................. C08J 9/18
[52] U.S. Cl. ........................................ 521/60; 521/56; 521/58; 521/144
[58] Field of Search ............................. 521/56, 60, 58

[56] References Cited

U.S. PATENT DOCUMENTS

| | | | |
|---|---|---|---|
| 4,168,353 | 9/1979 | Kitamori | 521/60 |
| 4,275,023 | 6/1981 | Shimizu et al. | 521/60 |
| 4,303,756 | 12/1981 | Kajimura et al. | 521/59 |
| 4,366,263 | 12/1982 | Sato et al. | 521/60 |
| 4,399,087 | 8/1983 | Akiyama et al. | 521/60 |
| 4,415,680 | 11/1983 | Ushirokawa et al. | 521/60 |
| 4,436,840 | 3/1984 | Akiyama et al. | 521/56 |

*Primary Examiner*—Morton Foelak
*Attorney, Agent, or Firm*—Armstrong, Nikaido, Marmelstein & Kubovcik

[57] ABSTRACT

A pre-expanded particle suitable for foaming in a mold comprising non-crosslinked linear low density polyethylene which has a characteristic property that an inclination of slope line obtained on a graph when logarithmic values of melt tension of the polyolefin are plotted as ordinate and reciprocals of absolute temperature at which the melt tension is measured are plotted as abscissa is not more than 1,500 is provided. A foamed article produced from the pre-expanded particles has an excellent appearance, a flat surface and good mechanical strength, and is useful for wrapping material, insulating material, a container or a fender of cars.

4 Claims, 1 Drawing Figure

PRE-EXPANDED PARTICLE OF NON-CROSSLINKED LINEAR LOW DENSITY POLYETHYLENE

CROSS-REFERENCE TO RELATED APPLICATION

This is continuation-in-part of application Ser. No. 584,859 filed on Feb. 29, 1984, now U.S. Pat. No. 4,540,718.

BACKGROUND OF THE INVENTION

The present invention relates to a pre-expanded particle of non-crosslinked linear low density polyethylene suitable for foaming within a mold which is able to close but unable to seal by heating with a heating medium such as steam.

In general, molding of a foamed article having a desired shape from pre-expaned particles of polyethylene is carried out by filling a mold which is able to close but unable to seal with pre-expanded particles, and heating the pre-expanded particles within the mold with a steam through a slit or small bores provided on the mold, whereby air within cells of the pre-expanded particle is expanded to cause expansion of the pre-expanded particles and, simultaneously, the pre-expanded particles are molten. As a result of the expansion of the molten pre-expanded particles, the space between the pre-expanded particles is closed and the molten pre-expanded particles are pressed against each other to give a desired foamed article in which the pre-expanded particles are fused together almost without clearance.

According to the process for foaming within the mold, occurance of temperature difference between the surface portion and the inner portion in the mold cannot be avoided, since the steam is introduced from outside the mold. The temperature difference becomes large when the mold is large and a desired article is thick. Also, when producing a desired foamed article having a thin portion and a thick portion, an optimum processing temperature varies at each portion.

A polyethylene such as a high density polyethylene (hereinafter referred to as "HDPE") or a high pressure processed, low density polyethylene (hereinafter referred to as "LDPE") is, however, inherently a crystalline polymer and has, in general, a narrow melting temperature range because of its crystallity. Accordingly, when the popular polyethylene is used as a material of the pre-expanded particle, a processing temperature capable of expanding the pre-expanded polyethylene particle in an optimum viscoelasticity is limited into a narrow temperature range. This fact requires a serious temperature control in the foaming process. That is, when the pre-expanded particles is heated to a temperature higher than the optimum processing temperature range, the melt viscosity of the particle becomes low, and thus the expanded air in the cells almost passed though the cell walls to the outside without expanding the cells. This fact results in lack of fusion between the pre-expanded particles. Even if the pre-expanded particles are expanded, the expanded cells in the foamed article thus obtained can easily shrink because of lack of inner pressure within the cells, or the cells become into open cell structure, which the foamed article easily shrinks and is reduced in mechanical propeties. When the pre-expanded particles is heated at a temperature lower than the optimum peocessing temperature range, the particle cannot be sufficiently expanded to give a foamed article having insufficient fusion between the particles and having a bad appearance due to remaining spaces between the particles.

In order to eliminate the above-mentioned disadvantages of the polyethylene, the polyethylene is crosslinked by using an organic peroxide or iradiating a radioactive ray to make the optimum processing temperature range thereof wide. However, such modification requires an additional crosslinking step and installation, which reduces the productivity and requires much cost. Also, since it is difficult to reuse the crosslinked polyethylene, the waste disposal of the foamed article has a problem.

In addition, for preparing the crosslinked polyethylene resin, the high-pressure processed LDPE is widely used as a starting material because the LDPE can be easily and well crosslinked. A pre-expanded particle obtained from the LDPE is superior in pliability and bufferability or cushoning property. However, the pre-expanded particle of the LDPE is inferior in heat-resistance and wants for solidity. Therefore, there can be used only the pre-expanded particle which has a relatively low pre-expansion ratio.

An object of the present invention is to provide a pre-expanded particle of a non-crosslinked polyethylene which has a wide optimum processing temperature range in the expansion molding within the mold, and is able to give a foamed article having a high expansion ratio and superior in heat-resistance, mechanical strength, pliability and cushioning property.

These and other objects of the present invention will become apparent from the description hereinafter.

SUMMARY OF THE INVENTION

In accordance with the present invention, there is provided a pre-expanded particle of non-crosslinked linear low density polyethylene having a characteristic property that an inclination of melt tension is not more than 1,500.

The pre-expanded particle of the present invention has a high pre-expansion ratio and is superior in heat-resistance, mechanical strength, pliability and cushoning property, and can be employed for foaming within a mold to give a good foamed article.

DETAILED DESCRIPTION

Figure 1:
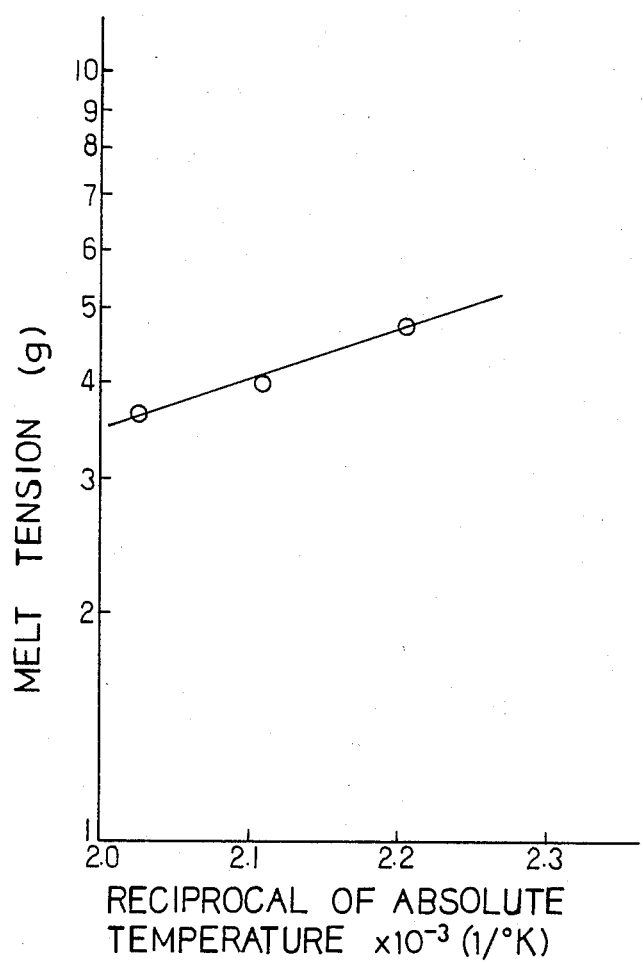
FIG. 1 is a graph showing a relationship between melt tension of non-crosslinked linear low density polyethylene used in Example 1 and absolute temperature.

In the present invention, a linear low density polyethylene (hereiafter referred to as "L-LDPE" is employed without crosslinking as the material of the pre-expanded particle.

In general, polyethylene is roughly classified into HDPE and LDPE. The HDPE is prepared by moderate or low pressure process and has no long branched chain and few short branched chains in the molecule, and thus has a high density. The LDPE is prepared by high pressure process and has short and long branched chains in the molecule, and thus has a density lower than that of HDPE.

The L-LDPE is a different polyethylene from the LDPE and the HDPE, and has a density as low as that of the LDPE and a linear structure similar to that of the HDPE. The L-LDPE is prepared by copolymerizing ethylene with an α-olefin having not less than four carbon atoms in the presence of a catalyst according to a moderate or low pressure process. In case of using propylene as the α-olefin, since the resulting branched chain is methyl residue, such very short branched chain is included in a amella structure. Accordingly, the resulting resin cannot obtain the properties of L-LDPE.

Since the L-LDPE is prepared by using a catalyst as mentioned above, the polymerization system becomes heterogeneous to vary the distribution of the short branched chains. As a result, the L-LDPE has various lamella structures of the crystals in size, which makes a range of melting temperatures of the crystals broader than that of the LDPE. This fact can be confirmed with a differential scanning calorimeter(DSC) by measuring a width of heat absorption peak, i.e. the peak of the L-LDPE being broader than that of the LDPE, and sometimes having a sholder peak. The HDPE has a sharp peak. Accordingly, the L-LDPE has the broadest melting temperature range, which makes the optimum processing temperature range wide.

Further, the L-LDPE has excellent mechanical properties such as tensile strength, tear strength and impact strength. In addition, the stiffness of the L-LDPE is greater than that of the LDPE when the densities of the resins are same. Furthermore, since the density of the L-LDPE is high, the stiffness can be increased, so that even if the expansion ratio of the L-LDPE is higher than that of the LDPE, the foamed article thus molded from the L-LDPE has the same cushioning property as the LDPE.

The L-LDPE employed in the present invention must have a characteristic property that an inclination of slope line obtained on a graph when logarithmic values of melt tension of the polyolefin are plotted as ordinate and reciprocals of absolute temperature (403° to 503° K.) at which the melt tension is measured are plotted as abscissa is not more than 1,500. Hereinafter, the above-defined inclination is referred to as "an inclination of melt tension", and a meaning of the term of an inclination of melt tension described in Claims are defined as same as above.

According to the descriptions in "Kobunshi Kako Kogaku" (Japanese translation of "Polymer Processing", by James M. McKelvey, published by JOHN WILEY & SONS, INC., New York, London, 1962), translated by Katsuhiko Itoh, published by Maruzen Kabushiki Kaisha, p37, Arrhenius stated that a relationship between log μ, wherein μ is a viscosity of the polymer, and reciprocal of absolute temperature is proportional in a range of 100 degree Fahrenheit.

The inclination of melt tension is one index for representing an optimum processing temperature range. When the inclination becomes low, melt viscosity of a resin varies in narrow range depending on temperature change, which makes the optimum processing temperature range of the pre-expanded particles in foaming process broader.

The inclination of melt tension continuously effects to the molding property of the pre-expanded particle. However, when a temperature difference in the mold comes in problem, for instance, when a large mold is used or a foamed article having various thicknesses is prepared, a foamed article of the L-LDPE having commercial values can only be obtained from the L-LDPE having an inclination of melt tension of not more than 1500 without crosslinking.

The inclination of melt tension relates to a molecular weight, distribution of molecular weight and molecular structure of a polyethylene. In general, an inclination of melt tension of a high pressure processed LDPE is about 1800 to 3000, and an inclination of melt tension of a L-LDPE is lower than about 2000, whereas in the present invention, the particular L-LDPE having an inclination of melt tension of not more than 1500 is advantageously employed.

According to the present invention, since the particular L-LDPE has a wide optimum processing temperature range as well as excellent mechanical properties, it is not necessary to crosslink.

An inclination of melt tension is, preferably not more than 1,000, more preferably not more than 700. When an inclination of melt tension is more than 1,500, it is difficult to control a pre-expansion ratio and cell size during a preparation of pre-expanded particles. In that case, even if pre-expanded particles of desired expanison ratio and cell size are obtained, the resulting foamed article is inferior in appearance and mechanical strength because in general the pre-expanded particles are not heated uniformly during foaming within a mold and they are partly shrinked or varied in shape due to overheating, or are not sufficiently expanded or fused together due to underheating.

According to one embodiment of the present invention, L-LDPE having 0.1 to 50 g/10 min of melt index measured according to JIS K 6760, 0.910 to 0.940 g/cm$^3$ of a density and 110° to 130° C. of a melting point is preferably employed.

When the melt index is less than 0.1 g/10 min, it is difficult to prepare the pre-expanded particles because a flowability of the polymer is not good during a preparation of the pre-expanded particles. On the other hand, when the melt index is more than 50 g/10 min, a flowability of the polymer is very high, and the obtained pre-expanded particles have low pre-expansion ratio and tend to shrink.

When the density is less than 0.910 g/cm$^3$, the polymer resin is so soft that the obtained pre-expanded particles are apt to shrink. On the other hand, when the density is more than 0.940 g/cm$^3$, the polymer behaves like a HDPE and a foaming procedure is difficult because of a reason described below.

When the melting point is less than 110° C., the pre-expanded particles have insufficient heat-resistance. On the other hand, when the melting point is more than 130° C., the polymer behaves like a HDPE and a foaming is difficult.

Above-mentioned α-olefin having 4 to 20 carbon atoms includes, for instance, 1-butene, 1-pentene, 1-hexene, 3,3-dimethyl-1-butene, 4-methyl-1-pentene, 4,4-dimethyl-1-pentene, 1-octene, 1-decene, 1-dodecene, 1-tetradecene, 1-octadecene and the like. The α-olefin is employed alone or in admixture thereof.

A content of the α-olefin varies according to a kind of the used α-olefin and is generally less than 20% by weight, preferably about 3 to about 12% by weight in the obtained L-LDPE.

Above-mentioned melting point is a peak temperature of the endothermic curve obtained by raising a temperature of a polymer sample at a rate of 20° C./min up to 200° C. to melt, cooling it at a rate of 20° C./min down to room temperature to crystallize and then, reheating it at a rate of 10° C./min with a differential scanning calorimeter (DSC).

According to another embodiment of the present invention, the L-LDPE can be blended with one or more polyethylene such as LDPE or HDPE in an amount of less than 50% by weight as long as the effects of the present invention are not inhibited. Also, additives such as an ultraviolet stabilizer, an antistatic agent, a heat stabilizer, a fire retardant, a coloring agent and inorganic powders can be added as occasion demands.

The pre-expanded particle of the particular L-LDPE can be prepared by a conventional pre-expansion process, for instance, a pre-expanding process in which a mixture of water and the particular L-LDPE particles impregnated with a volatile foaming agent is released from a condition of high temperature and high pressure to an atmosphere of low pressure.

The thus obtained pre-expanded particle of the particular L-LDPE of the present invention can be employed in a foaming process, for instance, a process that the obtained pre-expanded particles are, just as they are, or after aging or drying for a suitable time, or after giving them additional expansion ability, filled in a mold, and the pre-expanded particles are heated with a heating medium such as steam up to about 105° to about 130° C. for about 3 sec to about 2 min to give a molded article.

A method for further giving the pre-expanded particles additional expansion ability can be carried out, for instance, by introducing a gas such as nitrogen gas or air under pressure into the cells in the particles to elevate a pressure in the cells, or by pressing the pre-expanded particles with a compressed air to elevate a pressure in the cells. It is also effective to compress a mold charged with the pre-expanded particles made expansible or not before foaming.

The pre-expanded particles of the particular L-LDPE of the present invention are not stuck together at all and have uniform expansion ratio, and can be industrially employed for a conventional foaming process with ease because they have a wide optimum processing temperature range. The pre-expanded particles of the present invention can give a large size foamed article having a flat surface and a good mechanical strength. A foamed article produced from the pre-expanded particles of the present invention has an excellent appearance and a uniform density in which the pre-expanded particles are well fused together. The foamed article has a good cushoning property as similar to a conventional molded article of crosslinked LDPE, an excellent heat-resistance and a toughness, and are useful for wrapping material, insulating material, a container or a fender of cars.

The present invention is more particularly described and explained by means of the following Examples, in which all parts are parts by weight unless otherwise noted. It is to be understood that the present invention is not limited to the Examples and various changes and modifications may be made in the invention without departing from the spirit and scope thereof..

EXAMPLE 1

A 100 1 autoclave equipped with a stirrer was charged with 100 parts (25 kg) of non-crosslinked L-LDPE (containing 8% by weight of butene-1) particles containing 0.01 part of talc, and having an inclination of melt tension of about 585, a melting point measured by DSC method of 117° C., a density of 0.920 g/cm$^3$, MI of 0.8 g/10 min and a sphere diameter of 2 mm, 0.5 part of basic powdered calcium phosphate and 0.006 part of sodium dodecylbenzenesulfonate as dispersing agent and 300 parts of water. After stirring the mixture, to the dispersion thus obtained was added 45 parts of dichlorodifluoromethane with stirring and the temperature of the dispersion was raised to 112° C. A pressure in the autoclave at that time was 26 kg/cm$^2$·G.

By opening a releasing valve provided in a lower part of the autoclave, the aqueous dispersion of L-LDPE particles was released into an atmosphere of normal pressure through a round orifice having 4 mm in a diameter in an orifice plate provided behind the valve to give pre-expanded particles.

The obtained pre-expanded particles had an average pre-expansion ratio of 25 times and an average cell size of 230 γm. The results are summarized in Table 1.

The pre-expanded particles were dried at 60° C. for 24 hrs and subjected to foaming within a mold using SC-10B foaming machine (commercially available from Toyo Kikai Kinzoku Kabushiki Kaisha) under a condition as shown in Table 2 to give a foamed article.

With respect to the obtained foamed article, characteristic properties shown in Table 3 were evaluated as described below.

Rate of Shrinkage

After aging, a foamed article was left at room temperature for 24 hrs. A real volume of the article was measured by doping it into water. The obtained real volume and a volume of the used mold were inserted into a following equation to give a volume of article.

$$\text{Rate of shrinkage} = \frac{\text{A real volume of the foamed article}}{\text{A volume of the used mold cavity}} \times 100(\%)$$

Fusibility

A foamed article was broken at several portions and appearance of the exposed surfaces were observed. A proportion of particles which were broken themselves not at their fused surfaces was counted.
◎: The proportion is over 70%.
○: The proportion is over 50%, less than 70%.
×: The proportion is over 30%, less than 50%.

Surface Property

A surface of the obtained foamed article was observed.
○: The surface is almost smooth and flat.
△: Fused bounds are remarakable.
×: Fused bounds are very remarkale and an article is not commercially valuable.

Sink

A molded article was judged from the result of a rate of shrinkage and a shrinkage in a demension thereof.
○: Volume of article is over 90% and a shrinkage is less than 5%.
◎: Volume of article is over 90% and a shrinkage is 5% to 10%.
△: Volume of article is over 80%, less than 90%.
×: Volume of article is less than 80%.

Total judgement

A molded article was judged from the result of surface property and sink.
○: Surface property and sink are both ○, or ◎ and ○.

: Surface property and sink are both ○.
△: At least one of surface property and sink is △.
X: At least one of surface property and sink is X.

An inclination of melt tension of the used L-LDPE was obtained by measuring melt tension under a condition of a scan speed of 1.52 m/min, an air gap of 25 cm and an extruding speed of 0.25 g/min, at 180±0.4° C., 200±0.4° C. and 220±0.4° C., respectively using a melt tension tester commercially available from Toyo Seiki Seisakusho, Ltd. The obtained graph is shown in FIG. 1.

EXAMPLES 2 TO 3

The procedures of Example 1 were repeated except that non-crosslinked L-LDPE (containing 8% by weight of butene-1, density: 0.920 g/cm³, MI: 1.0 g/10 min) having an inclination of melt tension of about 900 (Example 2), and non-crosslinked L-LDPE (containing 8% by weight of butene-1, density: 0.920 g/cm³, MI: 1.0 g/10 min) having an inclination of melt tension of about 1,400 (Example 3) were employed instead of L-LDPE having an inclination of melt tension of about 585.

The characteristic properties of the obtained pre-expanded particles and the foamed article are summarized in Table 1 and Table 3, respectively.

COMPARATIVE EXAMPLES 1 and 2

The procedures of Example 1 were repeated except that non-crosslinked L-LDPE (containing 8.2% by weight of 4-methyl-1-pentene) having an inclination of melt tension of about 1,700 and non-crosslinked LDPE having an inclination of melt tension of about 3,000 were employed instead of L-LDPE having an inclination of melt tension of about 585.

The characteristic properties of the obtained pre-expanded particles and the foamed article are summarized in Table 1 and Table 3, respectively.

TABLE 2

| | Experimental No. | Mold size | Foaming condition Addition of internal pressure of pre-expanded particle | Pressure of steam (kg/cm²·G) | Aging (°C. × time) |
|---|---|---|---|---|---|
| Ex. 1 | 1 | S | No | 1.1 | 80 × 8 |
| | 2 | S | Yes | 1.2 | 60 × 12 |
| | 3 | L | No | 1.1 | 80 × 8 |
| | 4 | L | No | 1.7 | 80 × 8 |
| | 5 | L | Yes | 1.2 | 60 × 12 |
| | 6 | L | Yes | 1.8 | 60 × 12 |
| Ex. 2 | 7 | S | No | 1.1 | 80 × 8 |
| | 8 | S | Yes | 1.2 | 60 × 12 |
| | 9 | L | No | 1.1 | 80 × 8 |
| | 10 | L | No | 1.7 | 80 × 8 |
| | 11 | L | Yes | 1.2 | 60 × 12 |
| | 12 | L | Yes | 1.8 | 60 × 12 |
| Ex. 3 | 13 | S | No | 1.1 | 80 × 8 |
| | 14 | S | Yes | 1.2 | 60 × 12 |
| | 15 | L | No | 1.1 | 80 × 8 |
| | 16 | L | No | 1.7 | 80 × 8 |
| | 17 | L | Yes | 1.2 | 60 × 12 |
| | 18 | L | Yes | 1.8 | 60 × 12 |
| Com. Ex. 1 | 19 | S | No | 1.1 | 80 × 8 |
| | 20 | S | Yes | 1.2 | 60 × 12 |
| | 21 | L | No | 1.1 | 80 × 8 |
| | 22 | L | No | 1.7 | 80 × 8 |
| | 23 | L | Yes | 1.2 | 60 × 12 |
| | 24 | L | Yes | 1.8 | 60 × 12 |
| Com. Ex. 1 | 25 | S | Yes | 0.2 | 60 × 12 |
| | 26 | S | Yes | 0.4 | 60 × 12 |
| | 27 | S | Yes | 0.7 | 60 × 12 |

TABLE 3

| | Experimental No. | Characteristic properties of foamed article | | | | |
|---|---|---|---|---|---|---|
| | | Rate of shrinkage (%) | Fusibility | Surface property | Sink | Total judgement |
| Ex. 1 | 1 | 90 | ⊙ | ○ | ○ | ○ |
| | 2 | 94 | ○ | ○ | ○ | ○ |
| | 3 | 90 | ⊙ | ○ | ○ | ○ |
| | 4 | 90 | ⊙ | ○ | ○ | ○ |
| | 5 | 93 | ○ | ○ | ○ | ○ |
| | 6 | 91 | ⊙ | ○ | ○ | ○ |
| Ex. 2 | 7 | 91 | ⊙ | ○ | ○ | ○ |
| | 8 | 94 | ○ | ○ | ○ | ○ |
| | 9 | 91 | ⊙ | ○ | ○ | ⊙ |

TABLE 1

| | Components of the olefin polymer particle | | | Characteristic properties of the olefin polymer | | |
|---|---|---|---|---|---|---|
| | Kind of olefin polymer | Content of olefin polymer (parts) | Content of talc (part) | MI (g/10 min) | Density (g/cm³) | Melting point* (°C.) |
| Ex. 1 | L-LDPE | 99.99 | 0.01 | 0.8 | 0.920 | 117 |
| Ex. 2 | L-LDPE | 99.99 | 0.01 | 1.0 | 0.920 | 119 |
| Ex. 3 | L-LDPE | 99.99 | 0.01 | 1.0 | 0.920 | 120 |
| Com. Ex. 1 | L-LDPE | 99.99 | 0.01 | 2.1 | 0.920 | 122 |
| Com. Ex. 2 | LDPE | 99.99 | 0.01 | 1.3 | 0.924 | 109 |

| | Preparation condition | | | Characteristic properties of the obtained pre-expanded particle | | |
|---|---|---|---|---|---|---|
| | Temperature in the autoclave (°C.) | Pressure in the autoclave (kg/cm²·G) | Content of dichlorodifluoromethane (parts) | Pre-expansion ratio** | Diameter of cells (μm) | Inclination of melt tension |
| Ex. 1 | 112 | 26 | 45 | 24 to 26 | 150 to 300 | 585 |
| Ex. 2 | 115 | 28 | 45 | 24 to 26 | 100 to 200 | 900 |
| Ex. 3 | 116 | 27 | 43 | 23 to 26 | 100 to 200 | 1,400 |
| Com. Ex. 1 | 118 | 27 | 45 | 24 to 26 | 50 to 150 | 1,700 |
| Com. Ex. 2 | 103 | 23 | 45 | 29 to 31 | 150 to 300 | 3,000 |

*measured according to DSC method
**calculated by doping the pre-expanded particles into water

TABLE 3-continued

| | Experimental No. | Rate of shrinkage (%) | Fusibility | Surface property | Sink | Total judgement |
|---|---|---|---|---|---|---|
| | 10 | 90 | ◎ | ○ | ○ | ○ |
| | 11 | 94 | ○ | ○ | ◎ | ◎ |
| | 12 | 93 | ◎ | ○ | ○ | ○ |
| Ex. 3 | 13 | 91 | ○ | ○ | ◎ | ◎ |
| | 14 | 91 | ○ | ○ | ◎ | ◎ |
| | 15 | 90 | ○ | ○ | ◎ | ○ |
| | 16 | 90 | ◎ | ○ | ○ | ○ |
| | 17 | 93 | ○ | ○ | ◎ | ◎ |
| | 18 | 92 | ◎ | ○ | ◎ | ◎ |
| Com. Ex. 1 | 19 | 91 | ○ | ○ | ○ | ○ |
| | 20 | 94 | ○ | ○ | ○ | ○ |
| | 21 | 80 | × | Δ | Δ | Δ |
| | 22 | 85 | ○ | ○ | Δ | Δ |
| | 23 | 80 | × | Δ | Δ | Δ |
| | 24 | 85 | ○ | ○ | Δ | Δ |
| Com. Ex. 2 | 25 | Almost all the pre-expanded particles were remained. | × | × | × | × |
| | 26 | | × | × | × | × |
| | 27 | | × | × | × | × |

With respect to Comparative Example 2, as seen in Table 1, a pressure in the autoclave is lower because a melting point of used LDPE is low and the pre-expanded particles are shrinked when steam of 0.7 kg/cm²·G is employed.

In Table 2, with respect to a mold size, S represents a single cavity mold of 200 mm×200 mm×50 mm in cube, and L represents a single cavity mold of 400 mm×900 mm×50 mm in cube. In Table 2, with respect to addition of internal pressure of pre-exapaned particle, Yes represents that the pre-expanded particles were subjected to a compressing treatment by air before foaming under a condition of 60° C. and 10 kg/cm²·G for 1 to 2 hrs to give an internal pressure of the pre-expanded particle of 1.4 to 1.8 atm, and No represents that the pre-expanded particles were not subjected to such a compressing treatment, i.e. an internal pressure of the pre-expanded paticle before foaming was atmospheric pressure.

As shown in Table 1, pre-expanded particles of Example 1 to 3 have similar characteristic properties without being so influenced by an inclination of melt tension, because a control of heating is precisely realized during a preparation of the pre-expanded particles.

As clearly understood from Table 2 and 3, when the pre-expanded particles having an inclination of melt tension not more than 1,500 are employed for foaming within a mold, a foaming condition, a restriction of which is relaxed, can be employed and foamed articles can be constantly obtained.

On the other hand, when the pre-expanded particles having an inclination of melt tension is over 1,700 are employed, though a small foamed article is obtained, a large size of foamed article having a good appearance, in which the pre-expanded particles are well fused together, cannot be obtained

What we claim is:

1. A pre-expanded particle of non-crosslined linear low density ethylene copolymer which is a copolymer of ethylene and an α-olefin of $C_4$ to $C_{20}$ and has a characteristic property that an inclination of metlt tension is not more than 1,500.

2. The pre-expanded particle of claim 1, wherein said non-crosslinked linear low density ethylene copolymer has 0.1 to 50 g/10 min of melt index and 0.910 to 0.940 g/cm³ of a density.

3. The pre-expanded particle of claim 1, wherein said non-crosslinked linear low density ethylene copolymer contains less than 20% by weight of the α-olefin.

4. The pre-expanded particle of claim 1, wherein said non-crosslinked linear low density ethylene copolymer has a melting point of 110° to 130° C.

* * * * *